United States Patent
Barrell et al.

(10) Patent No.: US 10,481,828 B2
(45) Date of Patent: Nov. 19, 2019

(54) SLOW DRIVE DETECTION (71) Applicant: Seagate Technology LLC, Cupertino, CA (US)

(72) Inventors: Michael Barrell, Longmont, CO (US); Stephen S. Huh, Boulder, CO (US)

(73) Assignee: Seagate Technology, LLC, Cupertino, CA (US)

( * ) Notice: Subject to any disclaimer, the term of this patent is extended or adjusted under 35 U.S.C. 154(b) by 0 days.

(21) Appl. No.: 15/728,861

(22) Filed: Oct. 10, 2017

(65) Prior Publication Data

US 2019/0107970 A1    Apr. 11, 2019

(51) Int. Cl.
*G06F 3/06* (2006.01)
*G06F 9/06* (2006.01)
*G06F 16/2455* (2019.01)

(52) U.S. Cl.
CPC .......... *G06F 3/0653* (2013.01); *G06F 3/0611* (2013.01); *G06F 9/06* (2013.01); *G06F 16/24561* (2019.01)

(58) Field of Classification Search
CPC ........ G06F 3/0653; G06F 3/0611; G06F 9/06; G06F 17/30501
USPC .......................................................... 710/74
See application file for complete search history.

(56) References Cited

U.S. PATENT DOCUMENTS

| | | | | |
|---|---|---|---|---|
| 4,812,968 A * | 3/1989 | Poole | ...................... | G06F 13/14 710/37 |
| 6,154,853 A * | 11/2000 | Kedem | ............... | G06F 11/1084 711/114 |
| 6,836,832 B1 * | 12/2004 | Klinkner | ............... | G06F 3/0605 711/170 |
| 7,080,212 B1 * | 7/2006 | Hsu | ...................... | G06F 12/0862 711/137 |
| 7,216,263 B2 * | 5/2007 | Takaoka | .................. | G06F 3/061 709/224 |
| 7,389,396 B1 * | 6/2008 | Goel | .................... | G06F 11/0727 711/112 |
| 7,424,637 B1 * | 9/2008 | Schoenthal | ........... | G06F 3/0607 711/161 |
| 7,512,754 B1 * | 3/2009 | Chaitanya | ............. | G06F 3/0605 711/154 |
| 7,958,304 B1 * | 6/2011 | Goel | .................... | G06F 11/1096 711/114 |

(Continued)

*Primary Examiner* — Paul R Myers
(74) *Attorney, Agent, or Firm* — Holzer Patel Drennan (57) ABSTRACT

Implementations described and claimed herein provide a method and system for detecting slow storage drives. In one implementation, the method includes dynamically creating a storage drive peer group including a plurality of storage drives, comparing performance statistics of the storage drives in the storage drive peer group, selecting an outlier storage drive of the storage drive peer group based on the comparison of the performance statistics, passively monitoring response times of the storage drives in the storage drive peer group, comparing average response times of the storage drives in the storage drive peer group, flagging an outlier storage drive of the storage drive peer group with an outlier storage drive designation responsive to comparison of the average response times, actively measuring workload metrics of the outlier storage drive, comparing workload metrics data of the outlier storage drive to workload metrics reference data, and performing a remedial action.

19 Claims, 6 Drawing Sheets

(56) References Cited

U.S. PATENT DOCUMENTS

| | | | | |
|---|---|---|---|---|
| 8,601,313 B1* | 12/2013 | Horn | G06F 11/3034 | 714/6.32 |
| 8,880,801 B1* | 11/2014 | Robins | G06F 12/0246 | 711/114 |
| 8,892,938 B1* | 11/2014 | Sundaram | G06F 11/2092 | 714/6.21 |
| 8,938,477 B1* | 1/2015 | Tang | G06F 16/21 | 707/803 |
| 8,949,483 B1* | 2/2015 | Martin | G06F 3/0653 | 710/15 |
| 9,256,381 B1* | 2/2016 | Fultz | G06F 16/185 | |
| 9,311,207 B1* | 4/2016 | Marshak | G06F 11/3048 | |
| 9,626,116 B1* | 4/2017 | Martin | G06F 3/0689 | |
| 9,804,939 B1* | 10/2017 | Bono | G06F 11/2094 | |
| 9,892,014 B1* | 2/2018 | Hickey | G06F 11/3452 | |
| 10,061,525 B1* | 8/2018 | Martin | G06F 3/0617 | |
| 10,082,965 B1* | 9/2018 | Tamilarasan | G06F 12/00 | |
| 2005/0066237 A1* | 3/2005 | Greenwald | G11B 20/1816 | 714/42 |
| 2005/0114593 A1* | 5/2005 | Cassell | G06F 3/0605 | 711/114 |
| 2007/0067666 A1* | 3/2007 | Ishikawa | G06F 11/1088 | 714/6.21 |
| 2007/0101188 A1* | 5/2007 | Lin | G06F 11/1092 | 714/6.12 |
| 2007/0133325 A1* | 6/2007 | Kwon | G11C 29/76 | 365/201 |
| 2007/0192253 A1* | 8/2007 | Gill | G06F 21/10 | 705/51 |
| 2007/0192539 A1* | 8/2007 | Kano | G06F 3/0614 | 711/114 |
| 2008/0082871 A1* | 4/2008 | Chung | G11C 29/12015 | 714/719 |
| 2008/0172571 A1* | 7/2008 | Andrews | G06F 11/1076 | 714/6.12 |
| 2008/0195902 A1* | 8/2008 | Astigarraga | G11C 29/24 | 714/720 |
| 2010/0057988 A1* | 3/2010 | Okamoto | G06F 12/0246 | 711/114 |
| 2010/0205372 A1* | 8/2010 | Daikokuya | G06F 3/0607 | 711/114 |
| 2010/0265608 A1* | 10/2010 | Lee | G11B 20/182 | 360/31 |
| 2011/0153270 A1* | 6/2011 | Hoffman | G06F 17/18 | 702/179 |
| 2012/0166487 A1* | 6/2012 | Stougie | G06F 11/1076 | 707/792 |
| 2012/0311292 A1* | 12/2012 | Maniwa | G06F 3/061 | 711/170 |
| 2013/0027561 A1 | 1/2013 | Lee et al. | | |
| 2013/0030875 A1 | 1/2013 | Lee et al. | | |
| 2013/0132769 A1* | 5/2013 | Kulkarni | G06F 11/2094 | 714/6.22 |
| 2014/0359376 A1 | 12/2014 | Fahimi et al. | | |
| 2015/0277781 A1* | 10/2015 | Maruyama | G06F 3/0611 | 711/114 |
| 2017/0024295 A1* | 1/2017 | Klughart | G06F 17/30203 | |
| 2018/0052715 A1* | 2/2018 | Hayashi | G06F 9/46 | |

* cited by examiner

FIG. 1

I/O Pattern Example

| ID | ctr | Reads | Writes | R/W % | Seq % | Write Seq | Read Seq | Avg IO Size R/W | Seek Dist (R/W) | MB/s R/W |
|---|---|---|---|---|---|---|---|---|---|---|
| 3 | 0 | 292 | 46f | 36/63 | 18/81 | 18/81 | 7/92 | cc/fb | a2ec4f5/687bdb | 8/17 |
| 3 | 1 | 282 | 464 | 36/63 | 16/83 | 17/82 | 7/92 | cc/fb | b08ae46/7668178 | 8/17 |
| 3 | 2 | 292 | 48c | 36/63 | 16/83 | 17/82 | 5/94 | d1/f8 | c01d0e7/8841479 | 8/17 |
| 3 | 3 | 2c5 | 4a5 | 37/62 | 15/84 | 16/83 | 5/94 | cb/59 | a5f71fc/78e5268 | 8/17 |
| 3 | 4 | 2c5 | 4a6 | 37/62 | 16/83 | 17/82 | 5/94 | cf/58 | 97fd209/7286fe2 | 8/17 |
| 3 | 5 | 291 | 475 | 36/63 | 16/83 | 17/82 | 5/94 | cc/f9 | b126055/8069790 | 8/17 |
| 3 | 6 | 291 | 474 | 36/63 | 20/79 | 20/79 | 7/92 | cf/fb | 8519edb/58ceab9 | 8/17 |
| 3 | 7 | 2c2 | 492 | 37/62 | 7/92 | 10/89 | 5/94 | cb/f3 | f3865e4/c96f3f2 | 8/17 |
| 3 | 8 | 2a7 | 486 | 36/63 | 9/90 | 11/88 | 5/94 | ca/f4 | fe63236/c8a9508 | 8/17 |
| 3 | 9 | 2af | 475 | 37/62 | 15/84 | 16/83 | 5/94 | cf/fc | b22914/840bbee | 8/17 |
| 3 | 10 | 2cb | 49d | 37/62 | 18/81 | 18/81 | 7/92 | d1/fa | a8f9695/6c557df | 8/17 |
| 3 | 11 | 2e4 | 45d | 39/60 | 19/80 | 19/80 | 7/92 | d3/10b | 87e15db/5fb0835 | 9/17 |

SLOW DRIVE DETECTION

BACKGROUND

An increasing number of data centers are being built to satisfy the demands of popular Internet services such as social media, cloud computing and the like. Such data centers include large storage systems, which may include a number of servers, nodes, and a plurality of hard disk drives connected together over a network. Such large storage systems may be scaled linearly. Operations can be shared among all the devices within a large storage system, and may write data to multiple drives or multiple arrays in parallel. As such, one slow hard drive in a large storage system can slow down the performance of the rest of the drives in a system. If a specific problem causing a slow drive is not diagnosed, or in some cases, diagnosed incorrectly, and operations continue, the one slow drive impacts the overall performance of the storage system. Monitoring properties of such large storage systems can allow detection of degradation, failures, and errors in large storage systems.

SUMMARY

Implementations described and claimed herein provide a method and system for detecting slow storage drives. In one implementation, the method and system for detecting slow storage drives includes dynamically creating a storage drive peer group including a plurality of storage drives, comparing performance statistics of the storage drives in the storage drive peer group, selecting an outlier storage drive of the storage drive peer group based on the comparison of the performance statistics, passively monitoring response times of the storage drives in the storage drive peer group, comparing average response times of the storage drives in the storage drive peer group, flagging an outlier storage drive of the storage drive peer group with an outlier storage drive designation responsive to comparison of the average response times, actively measuring workload metrics of the outlier storage drive, comparing workload metrics data of the outlier storage drive to workload metrics reference data, and performing a remedial action.

This Summary is provided to introduce a selection of concepts in a simplified form that are further described below in the Detailed Descriptions. This Summary is not intended to identify key features or essential features of the claimed subject matter, nor is it intended to be used to limit the scope of the claimed subject matter. Other features, details, utilities, and advantages of the claimed subject matter may be apparent from the following more particular written Detailed Descriptions of various implementations as further illustrated in the accompanying drawings and defined in the appended claims. These and various other features and advantages may be apparent from a reading of the following detailed descriptions. Other implementations are also described and recited herein.

DETAILED DESCRIPTIONS

The present disclosure is related to large-scale, data processing and storage centers. For purposes of this disclosure, a data center refers to a collection of networked computers (e.g., servers, storage arrays) that are situated in a facility and used to provide general-purpose or special-purpose computing tasks on behalf of one or more customers. This type of service may be referred to as cloud computing, clustered computing, distributed computing, software as a service, etc. Generally, such systems share some common characteristics, such as large numbers of similar/identical computing nodes, large scale network interconnections, automated monitoring and control of computing nodes, specialized cooling and power distribution, etc.

The assembly and operation of a data center involves significant management. Although the computing equipment itself may include commercial, off-the-shelf components, the scale and complexity of the installation requires up-front and ongoing analysis to ensure that the system performs up to its potential. Many aspects of the data center may require custom design, such as power distribution, cooling, management software, etc. However, even where a large number of pre-manufactured devices are used, such as data storage devices, integration and high performance of these devices into the system may require careful planning.

In the disclosed technology, methods and systems are described that monitor data storage devices in a network data center. For purposes of this disclosure, data storage devices may also be referred to as "drives." Specifically, the methods and systems include detecting a slow drive and performing a remedial action to repair, replace, and/or remove the slow drive, if necessary.

In some implementations, a disk may be operating more slowly than disks in the same redundant array of inexpensive disks or same redundant array of independent disks (RAID), for example. The slow disk may be reported with an event, and with a health status in user interfaces. In another example, a disk may be operating more slowly than disks with the same characteristics. The slow disk may be reported with an event, and with a health status in user interfaces.

The drives in the network data center may include hard disk drives (HDD), solid-state drives (SSD), hybrid drives, optical drive units, and any other type of persistent data storage device that may be used in significant quantities in the operation of a network data center.

Figure 1:
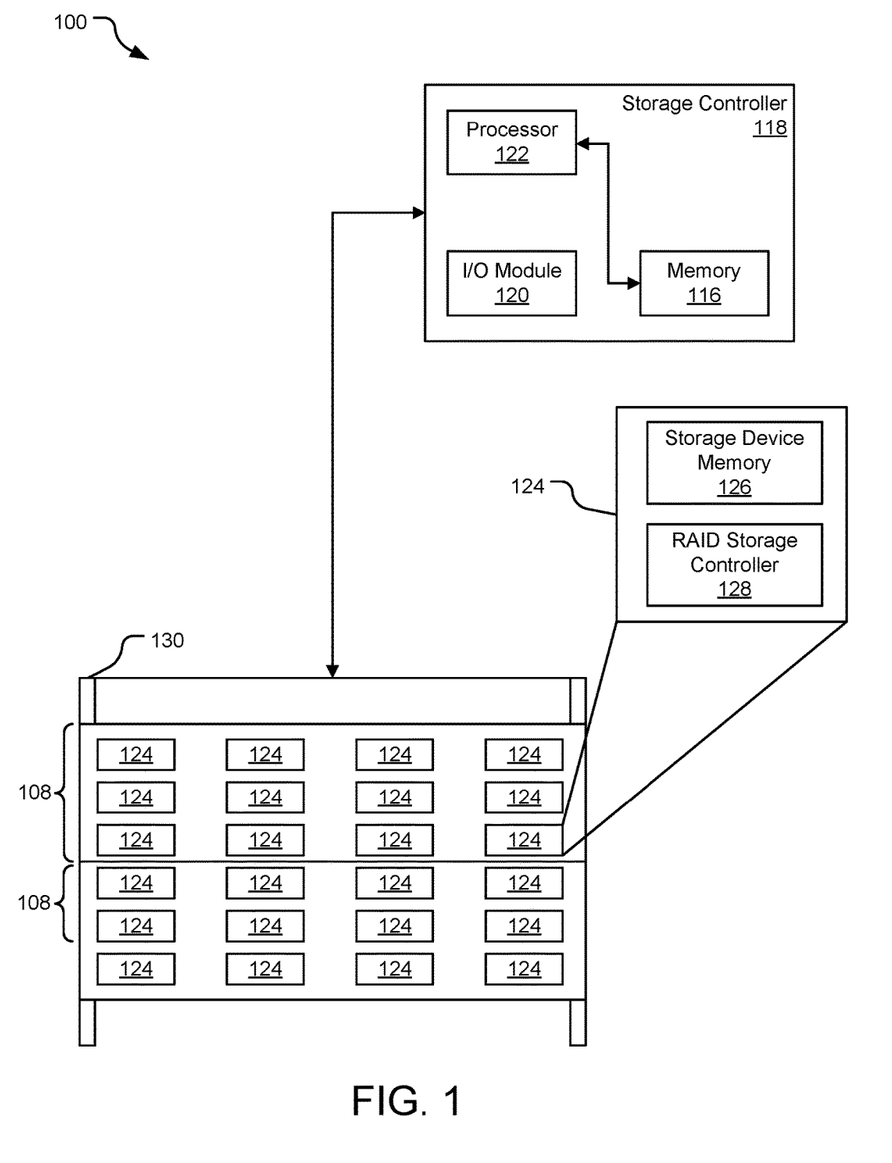
FIG. 1 illustrates a block diagram of an example data rack system.

FIG. 1 is a block diagram illustrating an example data storage system 100 that implements slow drive detection operations in a data center. The data storage system 100 may comprise any number of servers, nodes, enclosures, processors, slots, racks, chassis, etc. depending on the implementation.

Referring to FIG. 1, the data storage system 100 may include one or more processing units (e.g., a processor 122) coupled to one or more storage resources (e.g., a storage device 124). The processor 122 may be included in a storage controller 118. In general, the storage device 124 performs storage-related tasks such as read and write operations, while the processor 122 is configured to perform storage and/or computing tasks.

In FIG. 1, 24 storage devices 124 are shown distributed across two chassis (e.g., a chassis 108) mounted on a rack 130. In some implementations, one or more rack-mounted chassis racks may be configured into a data storage system 100. As shown in FIG. 1, each chassis 108 includes 12 storage devices 124.

In some implementations, the storage devices 124 may provide data redundancy. The storage devices 124 may include RAID controllers (e.g., a RAID controller 128) which provide data integrity through a built-in redundancy which includes data mirroring. The storage devices 124 are arranged such that, should one of the drives in a group forming a RAID array fail or become corrupted, the missing data can be recreated from the data on the other drives.

In some implementations, more than one drive may form a storage device 124. For example, a RAID array of drives may form a single storage device 124. The skilled person may be readily aware that the above features of the present embodiment could be implemented in a variety of suitable configurations and arrangements. Additionally, each storage device 124 comprising a RAID array of devices may appear to a host (not shown) as a single logical storage unit or drive.

In some implementations, a chassis-level or rack-level controller may communicate with the storage device 124 to perform slow detection operations, including selection of peer groups, passive monitoring of drives, active measurement of workload metrics, remedial operations, and other operations described in detail below. Alternatively, a storage controller of a storage device 124 may self-diagnose slow drives. For example, each storage device 124 has an associated storage controller (e.g., stored in memory and executed by an associated processor) that is configured to perform slow detection operations. Thus, in the following description, actions described as performed by a "storage controller" may, in different implementations, be performed by different types of controllers including without limitation drive-level controllers, chassis-level controllers, and rack-level controllers (e.g., a host computer). Various storage controllers within the data storage system 100 may also collect and share data that facilitates slow drive detection.

For illustrative purposes, the storage controller 118 in FIG. 1 may be described as performing a number of different mechanisms for detecting slow drives within the rack 130. The storage controller 118 includes a CPU or processor 122, which executes program instructions stored in a memory 116 coupled to the processor 122. The processor 122 includes any processing device suitable for executing storage controller 118 programs, such as Intel x86-compatible processors, embedded processors, mobile processors, and/or RISC processors. The processor 122 may include several devices including field-programmable gate arrays (FPGAs), memory controllers, North Bridge devices, and/or South Bridge devices. In one implementation, a processor 122 may include one or more sensors for measuring response times. For example, the processor 122 may include a timer (not shown).

A memory 116 may be one or more forms of volatile memory 116, non-volatile memory 116, or a combination of both volatile and non-volatile memories 116. The memory 116 includes firmware which includes program instructions that processor 122 fetches and executes, including program instructions for the processes of the present invention. Examples of non-volatile memory 116 include, but are not limited to, flash memory, SD, EPROM, EEPROM, hard disks, and NOVRAM. The volatile memory 116 stores various data structures and user data. Examples of the volatile memory 116 include, but are not limited to, SRAM, DDR RAM, DDR2 RAM, DDR3 RAM, Z-RAM, TTRAM, A-RAM, ETA RAM, and other forms of temporary memory.

The storage controller 118 can detect a slow drive in a large system (e.g., a storage system with 24 drives, 48, or 96 drives), determine why the slow drive is failing, and repair, remove, or replace the slow drive. As a result, the disclosed method restores the storage system performance.

Specifically, the storage controller 118 dynamically creates a peer group including a plurality of storage drives. In some implementations, a peer group includes a set of drives that share one or more characteristics. Depending on the configuration these characteristics can lead to various peer groups. In some implementations, drives may be in various peer groups at the same time. And, in some implementations, drives may be in different peer groups every sample. Thus, the drives that are compared in one peer group in one sample may be compared to a completely different peer group in the next sample.

Examples of characteristics that may be used to create a storage drive peer group include I/O Pattern, Drive Type, Drive Model, RAID group membership, location, and RPM. In some implementations, a drive type may include SAS or SATA drives. In some implementations, RAID group membership may include separating out drive as virtual disks based on mirroring technology (e.g., RAID 1). In some implementations, I/O pattern may include I/O size and queue depth. Comparing drives that are performing the same actions is critical when analyzing metrics, such as response time.

In some implementations, a storage drive peer group may be applicable for a single sample within the monitoring system. In some other implementations, for the next sample point and those after that the drives may be in the same peer group or different peer groups depending on the I/O pattern.

The storage controller 118 compares performance statistics of the storage drives in the storage drive peer group. In some implementations, the performance statistics may include response times. For example, the controller may passively monitor response times of the storage drive in the storage drive peer group. The controller can compare average response times of the storage drive peer group.

The storage controller 118 selects an outlier storage drive of the storage drive peer group based on the comparison of the performance statistics, or in some implementations, the response time. For example, any drive that has a response time greater than X times the mean of its peers for Y time is considered slow and moved to an active measurement operation (described below). The controller may flag the outlier storage drive of the storage drive peer group with an outlier storage drive designation.

If an outlier storage drive is identified, the outlier storage drive operations are suspended and the storage controller 118 actively measures workload metrics of the outlier storage drive, compares workload metrics data of the outlier storage drive to workload metrics reference data, and performs a remedial action (e.g. repair, replace, and/or remove the slow drive), if necessary, responsive to determining whether the difference between the workload metrics data of the outlier storage drive and the workload metrics reference data is above a predetermined threshold.

In some implementations, the reference measurement may be performed only once. For example, the reference measurement may be performed when the system initially introduces the drive. Reference measurement data is portable across systems. Thus, when the first controller encounters the drive, the reference measurement may be performed. In another example, when a drive is being added into a RAID group member as it is created, the measurement may be the same measurement as is performed in the active measurement operation. If a drive is being added into the RAID group member and the reference data already exists, the measurement may be performed again. If the check fails, then the RAID group member creation may be failed with an appropriate event posted to an event log.

The storage controller 118 monitors the plurality of storage drives to calculate workload metrics. In some implementations, for a storage drive peer group that is defined by I/O pattern, an I/O pattern module 120 monitors I/Os for all drives and calculates the workload metrics in a read I/O test to group drives together. The results may be saved in drive metadata. The workload metrics may include read/write (r/w) I/O percentage, overall r/w I/O sequential/random percentage, r/w average I/O size, r/w consecutive I/O counts, and r/w average seek distances, for example. In some implementations, if other workload metrics are calculated, other modules may be incorporated into the storage controller 118.

The storage controller 118 performs a remedial action (e.g., repair, replace, and/or remove the slow drive) responsive to determining whether the difference between the active measurement of the outlier storage drive and the reference measurement is above a predetermined threshold, or resumes passive monitoring if the storage controller 118 determines the difference between the active measurement of the outlier storage drive and the reference measurement is below the predetermined threshold.

Figure 2:
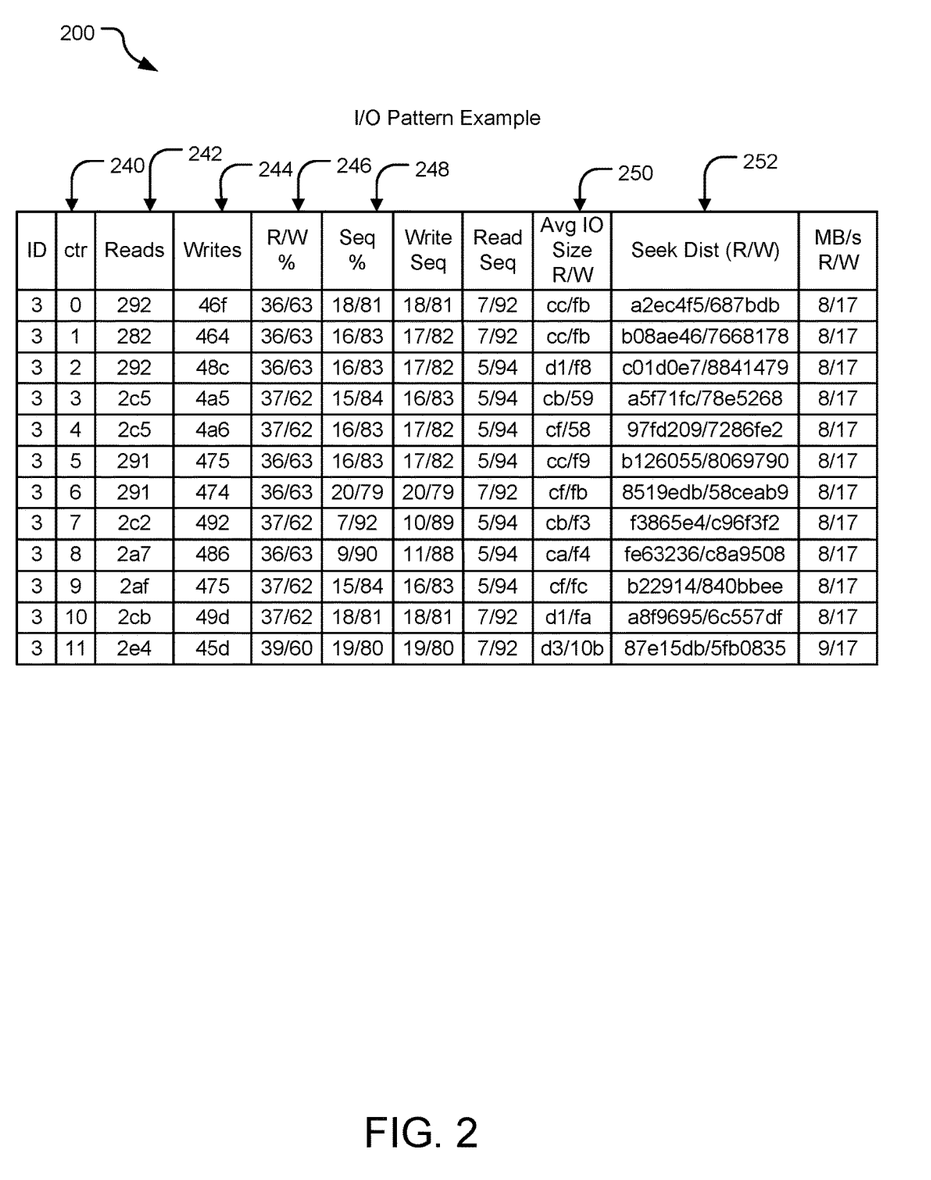
FIG. 2 is a table representing an example I/O pattern of workload metrics in a data storage system.

FIG. 2 is a table 200 representing an example I/O pattern of workload metrics in a data comparing drives that are performing the same actions is critical when looking at things like response time. In some implementations, an I/O pattern module monitors I/Os for all drives and generates I/O pattern metrics that can be used to group drives together.

The table 200 includes measurements of workload metrics for twelve drives in a system (e.g., drives 240) for use in the disclosed technology. The workload metrics can include a variety of measurable operations to group drives together by workload. As shown in FIG. 2, a number of reads (e.g., reads 242), a number of writes (e.g., writes 244), read/write (r/w) I/O percentages (e.g., percentages 246), overall r/w I/O sequential/random percentage (e.g., percentages 248), r/w average I/O size (e.g., sizes 250), and r/w average seek distances (e.g., distances 252) are tabulated. Other metric measurements are also shown in the table 200.

Figure 3:
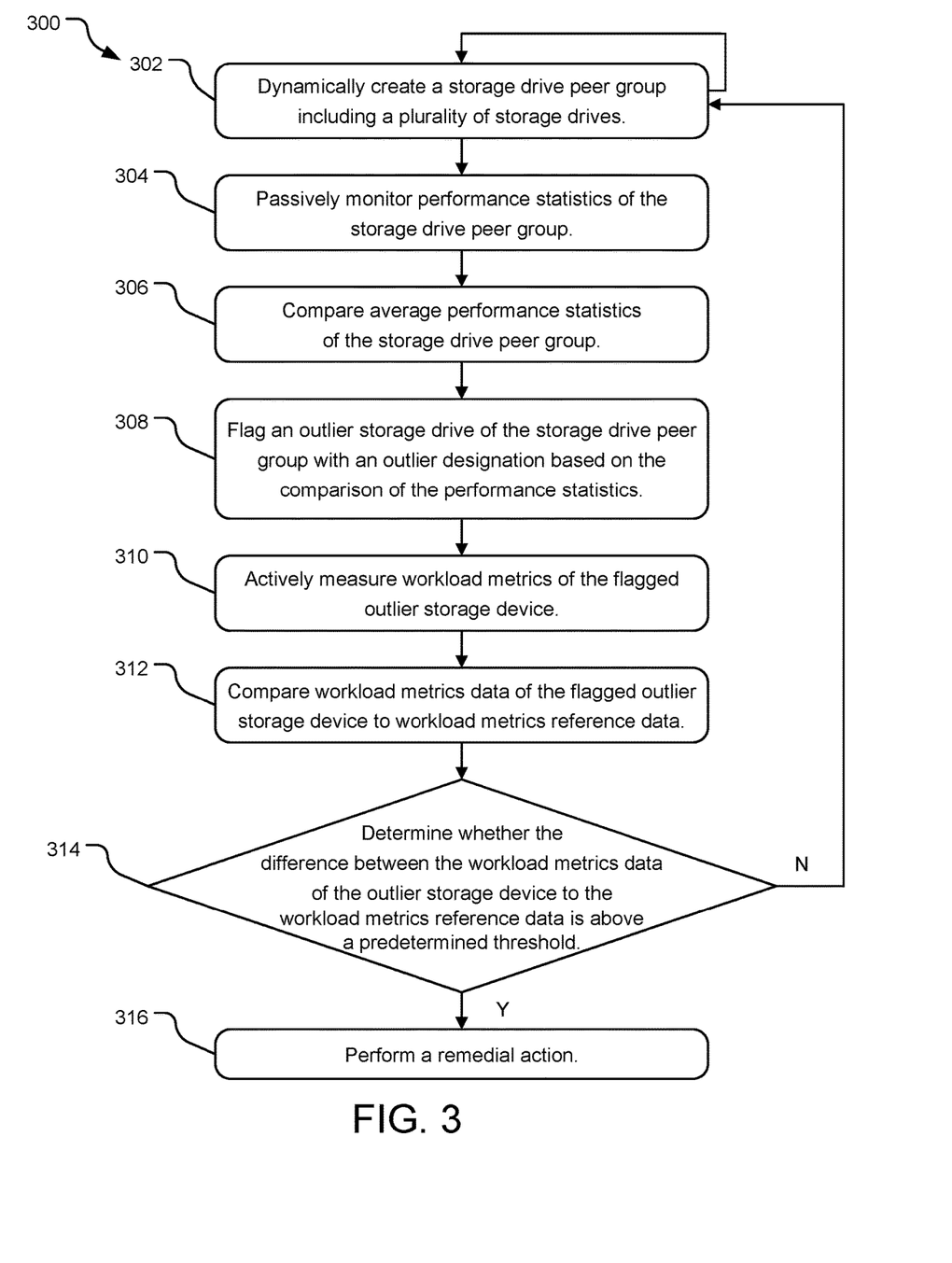
FIG. 3 illustrates a flow chart of example operations for detecting a slow drive in a data storage system.

FIG. 3 illustrates a flow chart of example operations 300 for detecting slow drive in a data storage system. An operation 302 dynamically creates a storage drive peer group in a plurality of storage drives. Dynamically creating a storage drive peer group can occur in various time intervals (e.g., every 15 minutes). Thus, operations 304-316 may occur while operation 302 dynamically creates a storage drive peer group.

A peer group may include a set of storage drives that share one or more characteristics. Depending on the configuration these characteristics can lead to various peer groups and depending on the exact configuration it may be possible to have a drive in various peer groups at the same time. However, for the initial implementation the slow drive evaluation may only be applied to a single peer group specified by the user. Examples of factors that may be used to create a peer group include I/O Pattern, drive type, drive model, RAID group membership, location, and RPM. In some implementations, drive type may include SAS or SATA drives. In some implementations, RAID group membership may include separating out drives as virtual disks based on mirroring technology (e.g., RAID 1). In some implementations, I/O pattern may include I/O size and queue depth.

In some implementations, a peer group of drives may be applicable for a single sample within the monitoring system. In some other implementations, for the next sample point and those after that, those drives may be in the same peer group or different peer groups depending on the I/O pattern.

An operation 304 passively monitors performance statistics of the storage drive peer group. In some implementations, monitoring performance statistics may include monitoring response times of the storage drives.

An operation 306 compares average performance statistics of the storage drive peer group. For example, the average response times may be compared. Based on the average response times, an operation 308 can flag an outlier storage drive of the storage drive peer group with an outlier storage drive designation based on the comparison of the performance statistics. For example, if a slower drive has a response time that does not meet a predetermined threshold for response times, the slower drive may be flagged as an outlier storage drive.

An operation 310 actively measures workload metrics of the flagged outlier storage drive. Workload metrics may include read/write (r/w) I/O percentage, overall r/w I/O sequential/random percentage, r/w average I/O size, r/w consecutive I/O counts, and r/w average seek distances, for example.

An operation 312 compares the workload metrics data of the flagged outlier storage drive to workload metrics reference data. An operation 314 determines whether the difference between the workload metrics data of the outlier storage drive and the workload metrics reference data is above a predetermined threshold.

If the operation 314 determines the difference between the workload metrics data of the outlier storage drive and the workload metrics reference data is above a predetermined threshold, an operation 316 performs a remedial action (e.g., repair, replace, and/or remove the slow drive).

If the operation 314 determines the difference between the workload metrics data of the outlier storage drive and the workload metrics reference data is below a predetermined threshold, operation 302 begins again.

In some implementations, the data storage system may have a self-diagnosis operation that diagnoses an outlier storage drive and performs a remedial operation without requiring active measurement. For example, a self-diagnosis operation may include performing specific I/O tests or using in drive diagnostics.

Figure 4:
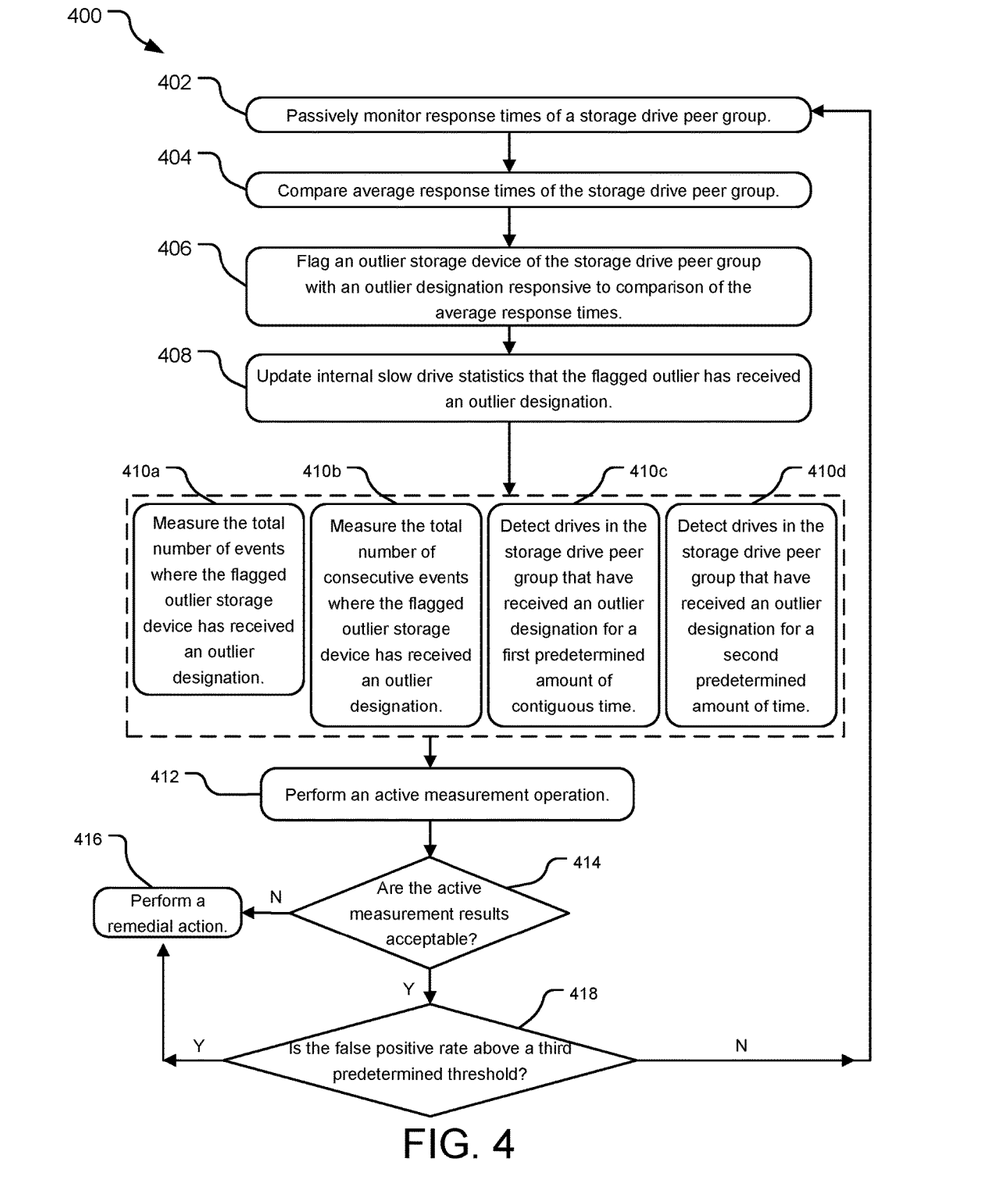
FIG. 4 illustrates a flow chart of example operations for passive monitoring of a data storage system.

FIG. 4 illustrates a flow chart of example operations 400 for passive monitoring of a data storage system. In one implementation, an operation 402 passively monitors response times of a storage drive peer group. An operation 404 compares average response times of the storage drive peer group.

An operation 406 flags an outlier storage drive of the storage drive peer group with an outlier storage drive designation responsive to comparison of the average response times.

An operation 408 updates internal slow drive statistics that the flagged outlier storage drive has received an outlier storage drive designation. Operations 410*a-d* perform various assessments to gather updated data on a storage peer group. Any of the operations 410*a-d* may occur, and other similar data measurement operations are contemplated. For example, an operation 410*a* measures the total number of events where the flagged outlier storage drive has received an outlier storage drive designation.

An operation 410b measures the total number of consecutives events where the flagged outlier storage drive has received an outlier storage drive designation. An operation 410c detects drives in the storage drive peer group that have received an outlier storage drive designation for a first predetermined amount of contiguous time. An operation 410d detects drives in the storage drive peer group that have received an outlier storage drive designation for a second predetermined amount of time.

An operation 412 performs an active measurement operation based on the updated data gathered in operations 410a-d. An operation 414 determines whether the active measurement operation yields acceptable results. In some implementations, acceptable results may be whether or not the active measurement operation passes or fails. If the active measurement operation yields results that are not acceptable, or fails, then a remedial action is performed in an operation 416.

If the active measurement operation yields results that are acceptable, an operation 418 determines whether a false positive rate is above a third predetermined threshold. If the false positive rate is above the third predetermined threshold, then a remedial action is performed in the operation 416. If the false positive rate is below a third predetermined threshold, operations 400 can begin again at operation 402, and passively monitor response times of a storage peer group.

In some implementations, if the frequency of the flagged outlier storage drive being slow without failing the active test operation is above the third predetermined threshold, another operation can flag an unpredictable event. An unpredictable event designation is a notification that the drive is performing unpredictably. In some implementations, flagging an unpredictable event can result in a notification of the unpredictable event to a system user.

Figure 5:
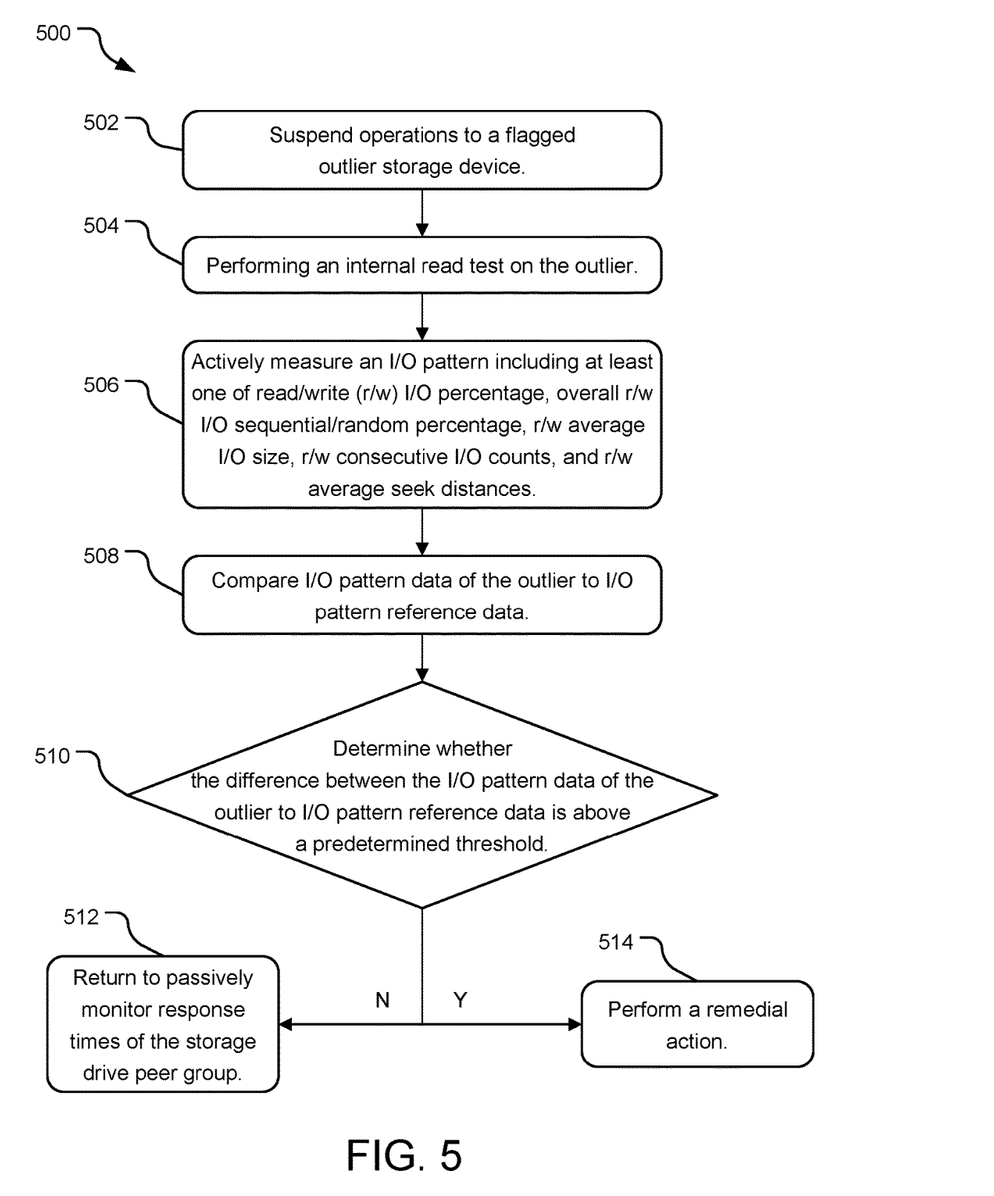
FIG. 5 illustrates a flow chart of example operations for active measurements in a data storage system.

FIG. 5 illustrates a flow chart of example operations 500 for active measurements in a data storage system. Following passive monitoring results that show an identified outlier storage drive is above a predetermined threshold of performance statistics in comparison with its storage drive peer group, an operation 502 suspends operations to the flagged outlier storage drive. In some implementations, the performance statistics may be a drive response time, and I/O pattern workload metrics can be measured to provide additional diagnosis regarding the outlier storage drive.

An operation 504 performs an internal read test on the outlier storage drive. An operation 506 actively measures an I/O pattern, as shown and described in FIG. 2. The I/O pattern may include at least one of a read/write (r/w) I/O percentage, an overall r/w I/O sequential/random percentage, a r/w average I/O size, r/w consecutive I/O counts, and r/w average seek distances. The results of the active measurements may be saved in drive metadata.

An operation 508 compares I/O pattern data of the outlier storage drive obtained in operation 506 to I/O pattern reference data. An operation 510 determines whether the difference between the I/O pattern data of the outlier storage drive to I/O pattern reference data is above a predetermined threshold. For example, a predetermined threshold may be a predetermined number of reads or writes, or a predetermined seek distance.

If the operation 510 determines the difference between the I/O pattern data of the outlier storage drive and the I/O pattern reference data is above a predetermined threshold, an operation 514 performs a remedial action (e.g., repair, replace, and/or remove the slow drive).

If the operation 510 determines the difference between the I/O pattern data of the outlier storage drive to I/O pattern reference data is below a predetermined threshold, an operation 512 returns to passively monitoring response times of the storage drive peer group.

Figure 6:
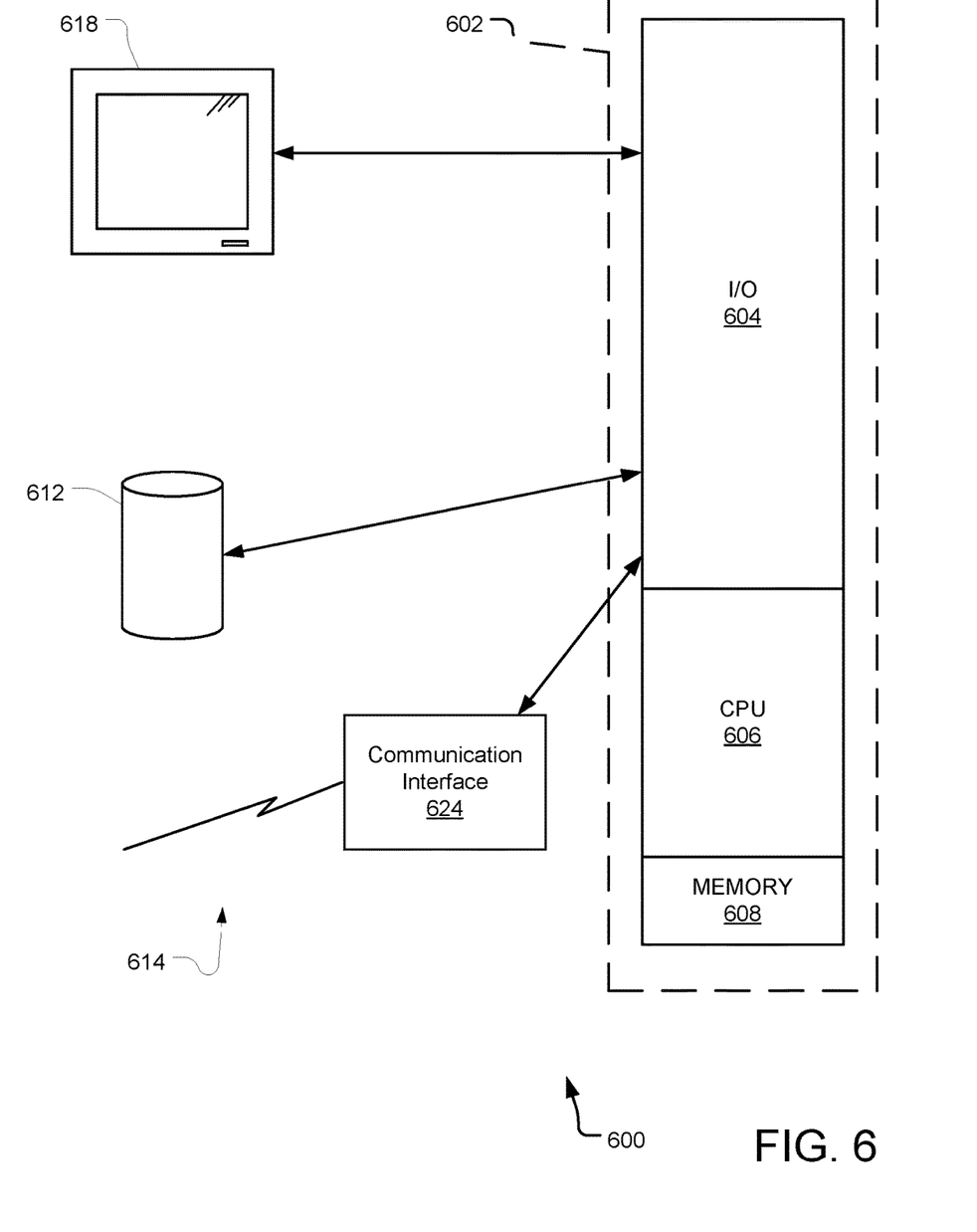
FIG. 6 illustrates a block diagram of an example computer system suitable for implementing the slow drive detection technology disclosed herein.

FIG. 6 illustrates a block diagram of an example computer system suitable for implementing the slow drive detection technology disclosed herein. The computer system 600 is capable of executing a computer program product embodied in a tangible computer-readable storage medium to execute a computer process. Data and program files may be input to the computer system 600, which reads the files and executes the programs therein using one or more processors. Some of the elements of a computer system 600 are shown in FIG. 6 wherein a processor 602 is shown having an input/output (I/O) section 604, a Central Processing Unit (CPU) 606, and a memory section 608. There may be one or more processors 602, such that the processor 602 of the computing system 600 comprises a single central-processing unit 606, or a plurality of processing units. The processors may be single core or multi-core processors. The computing system 600 may be a conventional computer, a distributed computer, or any other type of computer. The described technology is optionally implemented in software loaded in memory 608, a disc storage unit 612 or removable memory 618.

In an example implementation, the disclosed slow device detection process may be embodied by instructions stored in memory 608 and/or disc storage unit 612 and executed by CPU 606. Further, local computing system, remote data sources and/or services, and other associated logic represent firmware, hardware, and/or software which may be configured to adaptively distribute workload tasks to improve system performance. The disclosed methods may be implemented using a general purpose computer and specialized software (such as a server executing service software), and a special purpose computing system and specialized software (such as a mobile device or network appliance executing service software), or other computing configurations. In addition, program data, such as threshold requirements and other information may be stored in memory 608 and/or disc storage unit 612 and executed by processor 602.

For purposes of this description and meaning of the claims, the term "memory" means a tangible data storage device, including non-volatile memories (such as flash memory and the like) and volatile memories (such as dynamic random access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

The embodiments described herein are implemented as logical steps in one or more computer systems. The logical operations of the embodiments described herein are implemented (1) as a sequence of processor-implemented steps executing in one or more computer systems and (2) as interconnected machine or circuit modules within one or more computer systems. The implementation is a matter of choice, dependent on the performance requirements of the computer system implementing embodiments described herein. Accordingly, the logical operations making up the embodiments described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of example embodiments described herein. Since many alternate embodiments can be made without departing from the spirit and scope of the embodiments described herein, the invention resides in the claims hereinafter appended. Furthermore, structural features of the different embodiments may be combined in yet another embodiment without departing from the recited claims. The implementations described above and other implementations are within the scope of the following claims.

what is claimed is:

1. A method comprising:
dynamically creating a first storage drive peer group from a data storage system having a storage controller and a group of drives, the first peer group including a plurality of storage drives selected from the group of drives in the data storage system, the first peer group selected based on a shared characteristic including drive type, drive model, I/O pattern, or RAID group membership of drives in the first peer group, the first peer group being a subset of the group of drives;
comparing performance statistics of the plurality of storage drives in the first storage drive peer group;
selecting an outlier storage drive of the first storage drive peer group based on the comparison of the performance statistics; and
dynamically creating a second storage drive peer group from the group of drives, the second peer group including a second plurality of storage drives selected from the group of drives and selected based on a shared characteristic different than the shared characteristic of the first peer group, the shared characteristic including drive type, drive model, I/O pattern, or RAID group membership of drives in the second peer group, the second peer group being a second subset of the group of drives.

2. The method of claim 1, further comprising:
passively monitoring response times of the plurality of storage drives in the first storage drive peer group;
comparing average response times of the plurality of storage drives in the first storage drive peer group; and
flagging the outlier storage drive of the first storage drive peer group with an outlier storage drive designation responsive to comparison of the average response times.

3. The method of claim 2, further comprising:
updating internal slow drive statistics to indicate that the flagged outlier storage drive has received an outlier storage drive designation.

4. The method of claim 3, further comprising:
measuring the total number of events where the flagged outlier storage drive has received an outlier storage drive designation; and
measuring the total number of consecutives events where the flagged outlier storage drive has received an outlier storage drive designation.

5. The method of claim 4, further comprising:
detecting storage drives in the first storage drive peer group that have received an outlier storage drive designation contiguously for or above a first predetermined amount of contiguous time; and
detecting storage drives in the first storage drive peer group that have received an outlier storage drive designation for or above a second predetermined amount of time.

6. The method of claim 5, further comprising:
performing an active measurement operation;
determining whether active measurement results are acceptable; and
performing a remedial action responsive to determining the active measurement results are not acceptable.

7. The method of claim 6, further comprising:
determining whether a false positive rate is above a pre-determined threshold; and
passively monitoring response times of the first storage peer group responsive to determining the false positive rate is not above the pre-determined threshold.

8. The method of claim 7, further comprising:
performing an internal read test on the outlier storage drive;
actively measuring at least one of read/write (r/w) I/O percentage, overall r/w I/O sequential/random percentage, r/w average I/O size, r/w consecutive I/O counts, and r/w average seek distances of the outlier storage drive; and
comparing I/O patterns in the outlier storage drive to I/O pattern reference data.

9. The method of claim 7, further comprising:
determining whether a difference between the workload metrics data of the outlier storage drive to the workload metrics reference data is above a second pre-determined threshold; and
performing a remedial action for the outlier storage drive responsive to determining that the difference between the workload metrics data of the outlier storage drive to the workload metrics reference data is above the second pre-determined threshold.

10. The method of claim 7, further comprising:
determining whether the difference between the workload metrics data of the outlier storage drive to the workload metrics reference data is above a third pre-determined threshold; and
returning to passively monitoring response times of the first storage drive peer group responsive to determining that the difference between the workload metrics data of the outlier storage drive to the workload metrics reference data is below the third pre-determined threshold.

11. The method of claim 1, wherein subsequent to selecting an outlier storage drive of the first storage drive peer group, removing the outlier storage drive from the group of drives.

12. A storage device system comprising:
a plurality of storage drives; and
a storage controller configured to:
dynamically create a first storage drive peer group including at least two of the plurality of storage drives, the peer group selected from the plurality of storage drives based on a shared characteristic including drive type, drive model, I/O pattern, or RAID group membership of drives in the peer group, the peer group being a subset of the plurality of storage drives;
compare performance statistics of the storage drives in the first storage drive peer group;
select an outlier storage drive of the storage drive peer group for active measurement based on the comparison of the performance statistics; and dynamically create a second storage drive peer group including at least two of the plurality of storage drives, the second peer group selected from the plurality of storage drives based on a shared characteristic different than the shared characteristic of the first peer group, the shared characteristic including drive type, drive model, I/O pattern, or RAID group membership of drives in the second peer group, the second peer group being a second subset of the plurality of storage drives.

13. The system of claim 12, wherein the plurality of the storage drives is provided in parallel.

14. The system of claim 12, wherein the storage controller is further configured to:
passively monitor response times of the plurality of storage drives in the first storage drive peer group;
compare average response times of the plurality of storage drives in the first storage drive peer group; and
flag the outlier storage drive of the first storage drive peer group with an outlier storage drive designation responsive to comparison of the average response times.

15. The system of claim 12, wherein the storage controller is further configured to:
actively measure workload metrics of the outlier storage drive;
compare workload metrics data of the outlier storage drive with workload metrics reference data;
determine whether a difference between the workload metrics data of the outlier storage drive to the workload metrics reference data is above a predetermined threshold; and
perform a remedial action responsive to determining the difference between the workload metrics data of the outlier storage drive to workload metrics reference data is above a predetermined threshold.

16. The storage device system of claim 12, wherein the storage controller is further configured to, subsequent to selecting an outlier storage drive of the first storage drive peer group, remove the outlier storage drive from the group of drives.

17. A computer-readable storage medium encoding a computer program for executing a computer process on a computer system, the computer process comprising:
dynamically creating a first storage drive peer group including a plurality of storage drives selected from a group of drives in a data storage system, the first peer group selected based on a shared characteristic including drive type, drive model, I/O pattern, or RAID group membership of drives in the first peer group, the first peer group being a subset of the group of drives;
comparing performance statistics of the plurality of storage drives of the first storage drive peer group;
selecting an outlier storage drive of the first storage drive peer group based on the comparison of the performance statistics; and
dynamically creating a second storage drive peer group from the group of drives, the second peer group including a second plurality of storage drives selected from the group of drives and selected based on a shared characteristic different than the shared characteristic of the first peer group, the shared characteristic including drive type, drive model, I/O pattern, or RAID group membership of drives in the second peer group, the second peer group being a second subset of the group of drives.

18. The computer-readable storage medium of claim 17, further comprising:
passively monitoring response times of the plurality of storage drives in the first storage drive peer group;
comparing average response times of the plurality of storage drives in the first storage drive peer group; and
flagging an outlier storage drive of the first storage drive peer group with an outlier storage drive designation based on the comparison of the average response times.

19. The computer-readable storage medium of claim 17, further comprising:
actively measuring workload metrics of the outlier storage drive;
comparing workload metrics data of the outlier storage drive to workload metrics reference data;
determine whether a difference between the workload metrics data of the outlier storage drive to the workload metrics reference data is above a predetermined threshold; and
performing a remedial action for the outlier storage drive responsive to determining that the difference between the workload metrics data of the outlier storage drive to the workload metrics reference data is above a predetermined threshold.

* * * * *